Dec. 19, 1939.  A. C. KORTE  2,183,616
FUEL FILTER
Filed Nov. 27, 1937
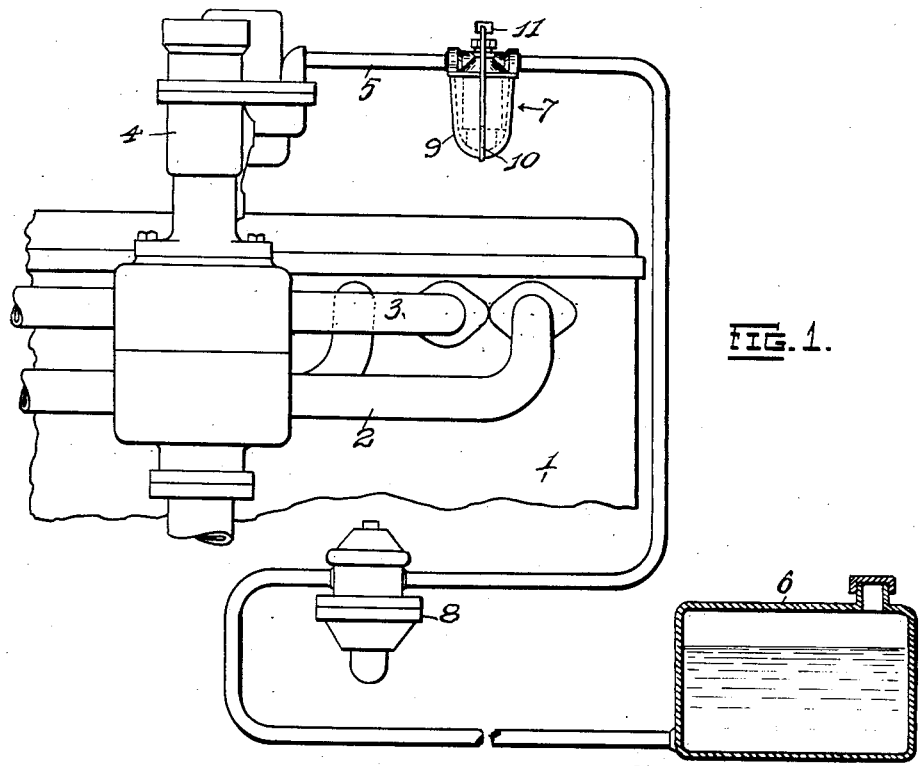
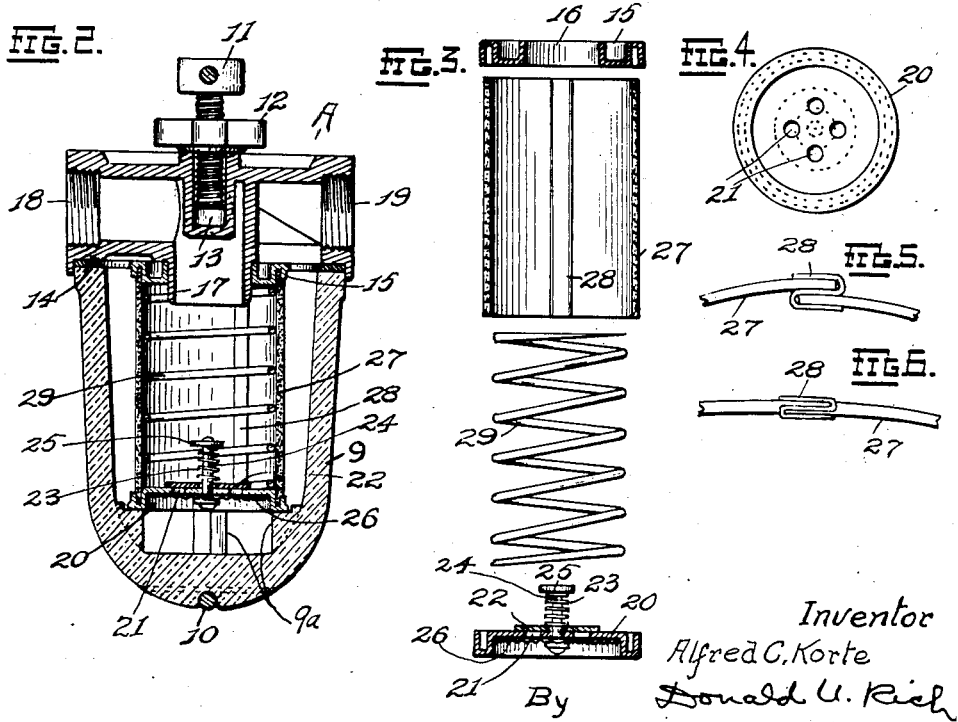
Inventor
Alfred C. Korte
By Donald U. Rich
Attorney.

Patented Dec. 19, 1939

2,183,616

UNITED STATES PATENT OFFICE 2,183,616

FUEL FILTER

Alfred C. Korte, St. Louis, Mo., assignor to Carter Carburetor Corporation, St. Louis, Mo., a corporation of Delaware Application November 27, 1937, Serial No. 176,778

1 Claim. (Cl. 210—165)

This invention relates to filters of the type particularly adapted for filtering the gasoline supplied to the combustion chambers in internal combustion engines.

Gasoline filters now generally in use utilize metal filter screens having interstices of such size that although some solid particles are strained out of the fuel stream, smaller particles suspended in the liquid are not affected. Finer screens have not been used because of the possibility of clogging and the non-availability of suitable filter material.

An object of the present invention is to provide a fuel filter device utilizing a filter element with sufficiently small interstices to intercept very small particles suspended in the fuel.

Another object is to provide a fuel filter utilizing a filtering element capable of removing fine particles from the fuel stream while at the same time eliminating the danger of cutting off the fuel stream due to clogging in the filter.

A more detailed object is to provide a practical fuel filter utilizing a filter element of paper or other fine, fibrous material.

These objects and other objects hereafter appearing are attained by the device illustrated in the accompanying drawing in which Fig. 1 is a diagrammatic representation of an internal combustion engine and a fuel filter, fuel pump, and fuel tank associated therewith.

Fig. 2 is a sectional view of the fuel filter.

Fig. 3 is a disassembled view of the filtering element.

Fig. 4 is an end view showing the bottom plate of the filtering element.

Figs. 5 and 6 are views illustrating the means of fastening and stiffening the abutting edges of the filtering material.

Fig. 1 shows an engine, in general of the automotive type, having a cylinder block 1, manifolds 2 and 3 and carburetor 4 for supplying fuel mixture to intake manifold 3. A tube 5 connects the carburetor with a fuel tank 6, conveniently located at the rear of the vehicle. Interposed in the fuel line 5 is a fuel filtering device, generally indicated at 7, and a fuel pump 8. All of the above parts with the exception of the fuel filter are well known and in themselves do not constitute the present invention.

The filtering device shown in Figs. 2–6 includes a head A, conveniently of die cast metal, and a glass bowl 9 secured to the head by a bale 10 carried by screw 11. A manipulating nut 12 is threaded on screw 11 and seats on the top of body portion A and permits tightening and loosening of the bale by drawing screw 11 into or out of a recess 13 in the center of part A. A gasket 14, interposed between part A and the bowl prevents leakage. The above described portion of the filter is described and claimed in detail in a co-pending application Serial No. 34,488, filed August 3, 1935, in the name of Fred A. Kommer.

The filtering element includes rigid upper end member 15 having a central opening 16 which is pressed over the boss 17, depending from the body portion. Boss 17 communicates with threaded outlet connection 18 formed in head part A. Opposite connection 18 is a second threaded connection 19 forming an inlet for attachment of the fuel line from the storage tank. At the opposite end of the filter element is a rigid lower end member 20, shown detailed in Fig. 4. Member 20 has a plurality of perforations 21 which are normally closed by a disk valve 22, yieldingly urged against the top of member 20 by a coiled compression spring 23. Spring 23 surrounds a pin 24 projecting vertically above the lower end member and is seated at its upper end against washer 25 on the pin. Secured to the under surface of end member 20 and extending across perforations 21 is a metal screen 26 of relatively fine mesh.

Enclosing the space between end members 15 and 20 is a tube 27 of fibrous filtering material, conveniently a treated paper as is disclosed in co-pending applications Ser. Nos. 168,082 and 168,083, both filed October 8th, 1937 in the names of W. C. Magruder, Jr. and A. C. Korte. This paper is treated with caustic soda and lacquer to render the same water proof and prevent swelling of the fibres due to soaking in the fuel. The paper is cut in a small rectangle and formed in tubular shape and the abutting edges are secured together by a Z-section metal rib 28, as shown in Figs. 5 and 6. This rib also functions as a longitudinal stiffening member. A coiled wire 29 is inserted in the tubular paper and extends around the inner wall thereof for bracing and stiffening. The filtering tube, at its lower end, rests on lugs 9a projecting from glass bowl 9 to provide additional bracing.

Inlet connection 19 communicates with bowl 9 outside filtering element 26 and normally all fuel is filtered through the fibrous tube, spring 23 being sufficiently strong to prevent opening of the by-pass under normal conditions. However, in case filtering tube 26 should become clogged with solid material removed from the fuel, the pressure in the bowl will increase, causing opening of relief valve 22, whereupon fuel passes through screen 26 and through perforations 21, and thence through the interior of tube 27 to outlet connection 18. Screen 26 is preferably formed of metal of the fineness of 100 or more mesh per square inch, and, although not as effective as the fibrous tube, provides substantial filtration. Thus effective filtration of the fuel is provided without the danger of stoppage of the fuel supply due to clogging in the filtering element. Tube 27 may be formed of any suitable woven or matted material which will withstand gasoline and moisture. The treated paper above mentioned is particularly advantageous since it provides effective filtration of very fine material and may be cheaply supplied.

Various modifications in the construction of the filter may be made as will occur to those skilled in the art and the exclusive use of all modifications as come within the scope of the appended claim is contemplated.

I claim:

In a filter, a head member formed with inlet and outlet ports, a bowl removably fixed to the head member and through which liquid is passed, said bowl having annularly spaced projections, a tubular filtering element secured to said head member, a perforated cap for the lower end of said tubular filtering element normally resting on said projections, the perforated portion of said cap being off-set upwardly to form a recess, one wall of which is in substantial vertical alignment with the inner faces of said projections and co-operates therewith to define a lower sediment chamber, a screen arranged in said recess and extending across the bottom face of the perforated portion of said cap, and means supported upon the upper face of the perforated cap portion normally closing the perforations against passage of fluid, said means being responsive to pressure accumulated outside of the confines of the tubular filter and opening inward to relieve such pressure.

ALFRED C. KORTE.